United States Patent
Liu et al.

(10) Patent No.: US 7,751,062 B2
(45) Date of Patent: Jul. 6, 2010

(54) OPTICAL FLYING HEIGHT MEASUREMENT AND CALIBRATION WITH DUAL SLIDERS

(75) Inventors: Bo Liu, Singapore (SG); Zhimin Yuan, Singapore (SG); Ka Wei Ng, Singapore (SG)

(73) Assignee: Agency for Science, Technology and Research, Centro (SG)

( * ) Notice: Subject to any disclaimer, the term of this patent is extended or adjusted under 35 U.S.C. 154(b) by 87 days.

(21) Appl. No.: 12/097,224

(22) PCT Filed: Dec. 12, 2006

(86) PCT No.: PCT/SG2006/000387

§ 371 (c)(1),
(2), (4) Date: Oct. 13, 2008

(87) PCT Pub. No.: WO2007/070015

PCT Pub. Date: Jun. 21, 2007

(65) Prior Publication Data

US 2009/0323079 A1    Dec. 31, 2009

(51) Int. Cl.
G01B 9/02 (2006.01)
(52) U.S. Cl. ..................................... 356/507
(58) Field of Classification Search .................. 356/501, 356/507, 498
See application file for complete search history.

(56) References Cited

U.S. PATENT DOCUMENTS

| | | | |
|---|---|---|---|
| 5,457,534 A | 10/1995 | Lacey et al. | |
| 5,757,492 A | 5/1998 | Tokutomi et al. | |
| 5,953,125 A | 9/1999 | de Groot | |

(Continued)

FOREIGN PATENT DOCUMENTS

EP    0209140 A2    1/1987

OTHER PUBLICATIONS

T. Ohkubo, et al., "Accurate Measurement of Gas-lubricated Slider Bearing Separation Using Visible Laser Interferometry," Journal of Tribology Transaction of the ASME, Oct. 1987, pp. 1-6.

(Continued)

*Primary Examiner*—Hwa S. A Lee
(74) *Attorney, Agent, or Firm*—Franklin D. Ubell; Greenberg Traurig, LLP

(57) ABSTRACT

A method for optical flying height measurement, and a flying height tester. The method the method comprises the steps of aligning a first slider and a second slider adjacent a transparent disk; varying a rotational speed of the disk relative to the first slider whereby a spacing between the first slider and the disk changes; measuring changes in a first reflected light intensity caused by interference of a light signal portion reflected from the first slider and a light signal portion reflected from a surface of the disk, wherein the rotational speed is varied over a range such that one maximum and minimum intensities pair is measured in the reflected light intensity; measuring a second reflected light intensity caused by interference of a light signal portion reflected from the second slider and a light signal portion reflected from a surface of the disk at a fixed rotational speed between the disk and the second slider; and calculate a flying height of the second slider using the measured maximum and minimum intensities pair and the measured second reflected light intensity.

20 Claims, 5 Drawing Sheets

U.S. PATENT DOCUMENTS 6,710,881 B1     3/2004    Ngoi et al.
2004/0085547 A1 *   5/2004    Li et al. ........................ 356/507

OTHER PUBLICATIONS

C.W. Strunk, J.L. Lo, and P.J. Sides, "Calibration of flying height measured by scattered total internal reflection", IEEE Trans. Magn., vol. 36, No. 5, Sep. 2000.

L.Y. Zhu, K.F. Hallamasek, and D.B. Bogy, "Measurement of Head/Disk Spacing with a laser interfermoter", IEEE Trans. Magn., vol. 24, No. 6, Nov. 1988.

M.H. Wahl, J.C. Briggs, and F.E. Talke, "Interferometric spacing measurements of the Bernoulli head/disk interface," IEEE Trans. Magn., vol. 28, No. 5, Sep. 1992.

* cited by examiner

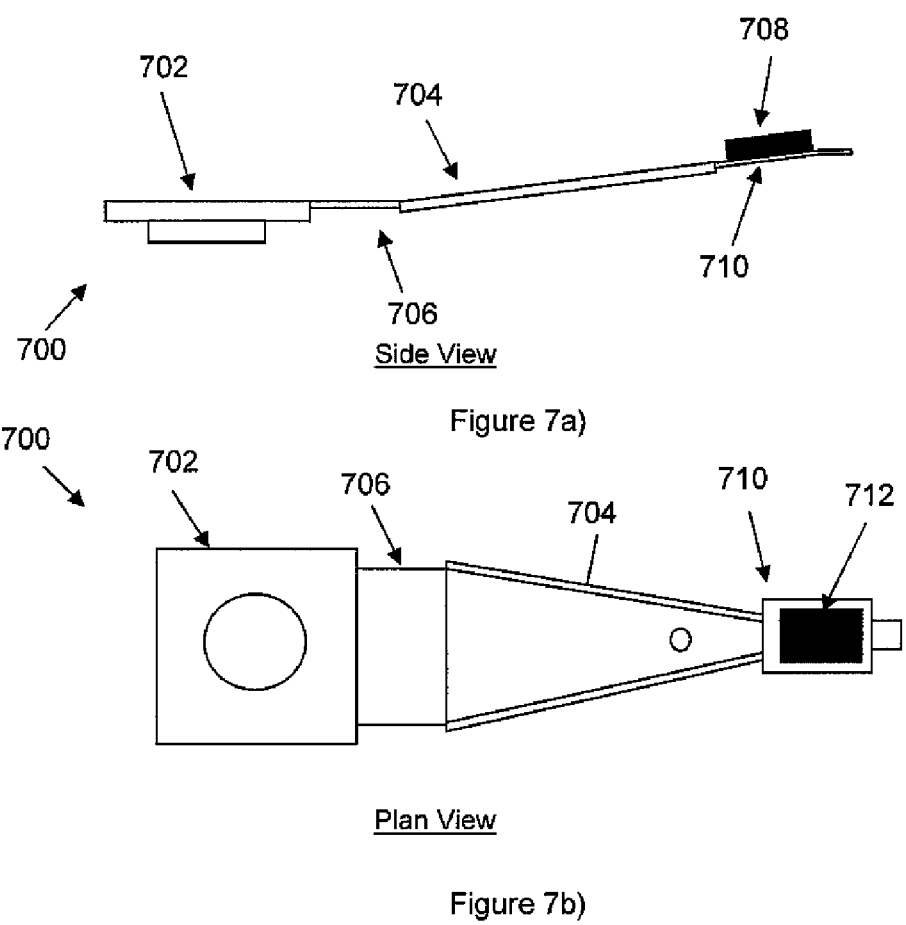
Figure 7a)
Figure 7b)
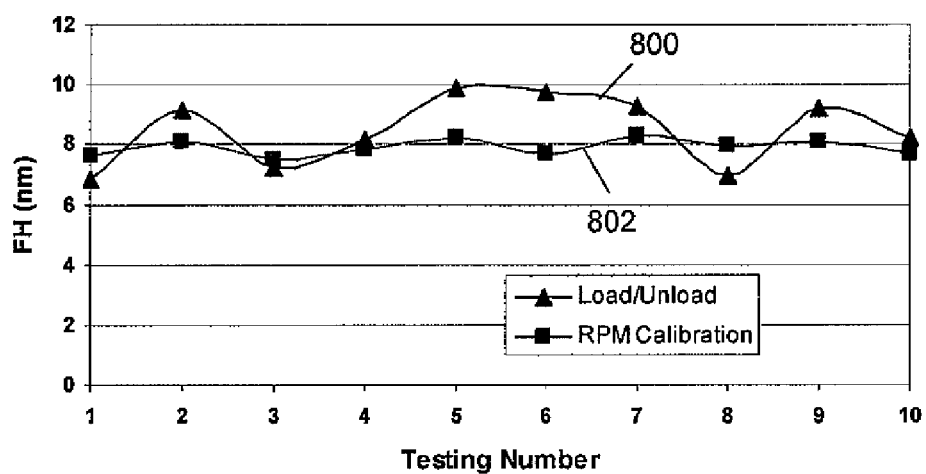
Figure 8

OPTICAL FLYING HEIGHT MEASUREMENT AND CALIBRATION WITH DUAL SLIDERS

FIELD OF INVENTION

The invention relates broadly to a method for flying height measurement, and to a flying height tester.

BACKGROUND

The optical calibration process for interferometry based flying height measurements is an important process in determining the accuracy and repeatability of head-disk spacing measurements. The light intensity calibration is typically performed by measuring the maximum and minimum fringe intensity of a light signed while changing the head-disk spacing by at least ¼ wavelength of the light signed. Existing calibration methods use loading and unloading method to alter the spacing of the disk and slider, such as the method disclosed in U.S. Pat. No. 5,457,534, Lacey et al. The intensity $I_{out}$ of the light reflected from both the slider and from the glass surface of a transparent test disk based on multi-beam interference is given by:

$$\frac{I_{out}}{I_{in}} = \frac{r_1^2 + r_2^2 + 2r_1 r_2 \cos\delta}{1 + r_1^2 r_2^2 + 2r_1 r_2 \cos\delta} \quad (1)$$

where $r_1$ and $r_2$ are fringe intensities of the light reflected off the slider $r_1$ and the light reflected off the disk $r_2$, and $I_{in}$ is the incident light intensity. The phase angle difference $\delta$ between two reflections is a function of the phase shift $\phi_s$ on reflection off the slider surface. The value of $\delta$ can be derived as, $$\delta = \frac{4\pi h}{\lambda} + 2\pi - \phi_s \quad (2)$$

where $\lambda$ is the wavelength of the light, h is the flying height and $\phi_s$ is the phase shift. The intensity of the resultant light detected at the detector changes as the distance h between the disk surface and the slider surface varies from a low (loaded) to high (unloaded) value. FIG. 1 shows a typical plot of intensity changes against time for the load/unloading process.

As the flying height (FH) is reduced to the sub-10 nm region, a higher negative pressure air-bearing is typically required to generate a high suction force which pulls the slider closer to the disk surface and increases the flying stability of the slider. As a result, the suction force, which is contrary to the unloading force, causes the slider to vibrate when the slider is forced to withdraw from the disk. This vibrational behaviour is clearly discernable in the example curves 100, 102, 104 shown in FIG. 1 for different light signal wavelength, in the region between the loaded position 106, and the unloaded position 108. This vibrational behaviour results in a "smearing" of the periodic intensity changes corresponding to the interference fringes, making a determination of the intensity values for the maxima and minima difficult and inaccurate. This can affect the calibration and measurement accuracy.

The unloading position of the slider is another important factor which can affect the measurement accuracy. Due to the pivoting position of the suspension, the unloading process will affect the pitch angle of the slider. An higher pitch angle will increase the fall-off of the maximum and minimum of the intensity and consequently increase the error in the measurement. Another drawback for the load/unload calibration method is, that repeated landing of the slider on the disk may damage and contaminate the air bearing surface (ABS) of the slider. The damages are more significant when an extremely low FH slider is used in the measurement.

Generally, other than the load/unload method, any mechanism which unloads the head from the disk by a quarter wavelengths or more can be used for the maximum and minimum intensity calibration. For example, in the disk drive system, the relative linear speed between the head and recording media is controlled by the rotational speed of the spindle motor. Increasing the spindle speed will increase the separation of the head and media by changing the air-bearing pressure of the slider. By changing the separation between the head and media, the interferometric intensity varies enough to detect at least one maximum and minimum fringe intensity which can be used for the calibration process, as disclosed in T. Ohkubo et al., "Accurate Measurement of Gas-lubricated Slider Bearing Separation Using Visible Laser Interferometry", Journal of Tribology Transaction of the ASME, October 1987, pp. 1-6. FIG. 2 shows the intensity plot of what is termed the RPM calibration process. Curves 200, 202, and 204 for different light signal wavelength, show that lower slider vibration can be achieved by using the RPM calibration process compared to the load/unload calibration. Consequently, this will reduce the calibration noise and increase the measurement accuracy.

However, in the RPM calibration process the slider ABS design must be such that the FH will increase to above $\lambda/2$ by changing the RPM of the spindle. Current ABS slider with extremely low FH, say less than 10 nm, are not able to fly as high as $\lambda/2$ even at very high spindle speed.

A need therefore exists to provide an optical flying height calibration and measurement technique that seeks to address at least one of the above mentioned disadvantages.

SUMMARY

According to a first aspect of the present invention, there is provided a method for optical flying height measurement, the method comprising the steps of aligning a first slider and a second slider adjacent a transparent disk; varying a rotational speed of the disk relative to the first slider whereby a spacing between the first slider and the disk changes; measuring changes in a first reflected light intensity caused by interference of a light signal portion reflected from the first slider and a light signal portion reflected from a surface of the disk, wherein the rotational speed is varied over a range such that one maximum and minimum intensities pair is measured in the reflected light intensity; measuring a second reflected light intensity caused by interference of a light signal portion reflected from the second slider and a light signal portion reflected from a surface of the disk at a fixed rotational speed between the disk and the second slider; and calculate a flying height of the second slider using the measured maximum and minimum intensities pair and the measured second reflected light intensity.

The first and second sliders may be mounted on a single cartridge aligned adjacent the disk.

The first and second sliders may be aligned substantially in parallel with respect to each other on the cartridge.

The first and second sliders may be positioned on a same track of the disk utilizing separate cartridges.

The rotational speeds of the disk relative to the first and second sliders may be varied by changing the rotating speed of the disk.

The rotating speed of the disk may be varied from about 1500 to about 20000 rpm.

The second slider may have a smaller range of flying height variation than the first slider.

The first slider may have a positive pressure slider design.

The second slider may have a negative pressure slider design.

The measurements of the changes in the first reflected light intensity and the second reflected light intensity may comprise measurements at different wavelengths.

According to a second aspect of the present invention, there is provided a flying height tester comprising a transparent disk; means for aligning a first slider and a second slider adjacent a transparent disk; means for varying a rotational speed of the disk relative to the first slider whereby a spacing between the first slider and the disk changes; means for measuring changes in a first reflected light intensity caused by interference of a light signal portion reflected from the first slider and a light signal portion reflected from a surface of the disk, wherein the rotational speed is varied over a range such that one maximum and minimum intensities pair is measured in the reflected light intensity; means measuring a second reflected light intensity caused by interference of a light signal portion reflected from the second slider and a light signal portion reflected from a surface of the disk at a fixed rotational speed between the disk and the second slider; and means for calculating a flying height of the second slider using the measured maximum and minimum intensities pair and the measured second reflected light intensity.

The means for aligning the first and second sliders may comprise a single cartridge aligned adjacent the disk.

The first and second sliders may be aligned substantially in parallel with respect to each other on the cartridge.

The means for aligning the first and second sliders may comprise separate cartridges for positioning on a same track of the disk.

The means for varying the rotational speeds of the disk relative to the first and second sliders may comprise a motor coupled to the disk for changing the rotating speed of the disk.

The rotating speed of the disk may be variable from about 1500 to about 20000 rpm.

The second slider may have a smaller range of flying height variation than the first slider.

The first slider may have a positive pressure slider design.

The second slider may have a negative pressure slider design.

The means for measurements of the changes in the first reflected light intensity and the means for measuring the second reflected light intensity may be arranged for measurements at different wavelengths.

BRIEF DESCRIPTION OF THE DRAWINGS

These and other aspects and advantages of the invention will be described in detail with reference to the accompanying drawings, in which:

FIG. 7a and FIG. 7b show schematic side and top views respectively of a mounting assembly for a slider.

FIG. 8 is a graph showing a comparison of FH measurement for a conventional slider load/unload method and for the RPM calibration method using the slider assembly cartridge of FIG. 3.

DETAIL OF INVENTION DISCLOSURE

Figure 1:
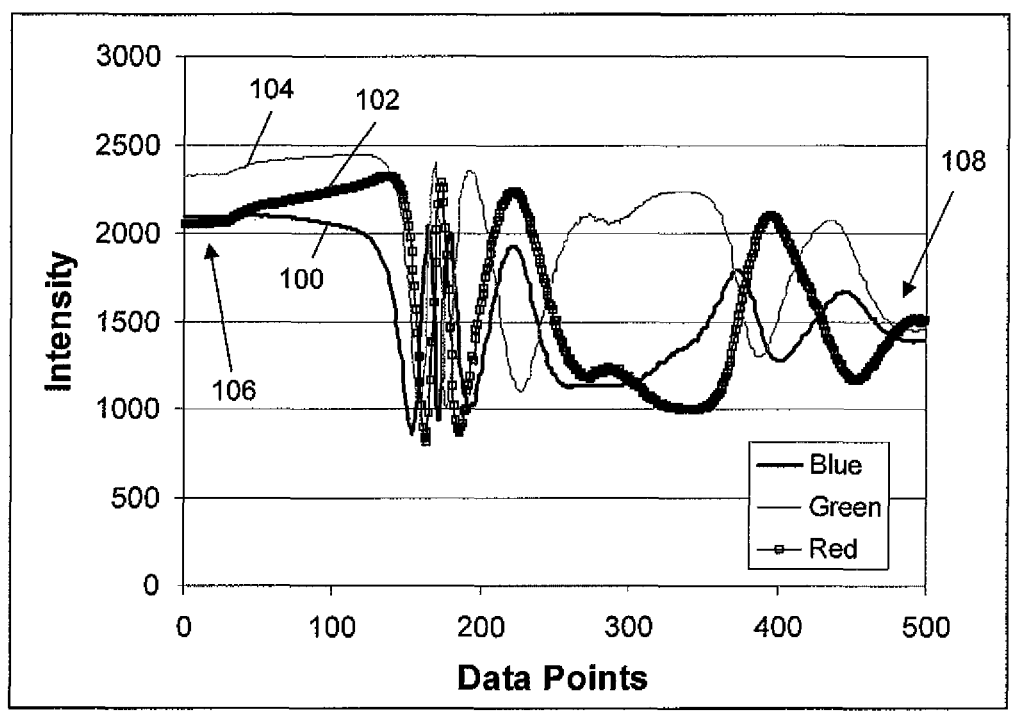
FIG. 1 shows measured intensity changes for load/unload calibration.
Figure 2:
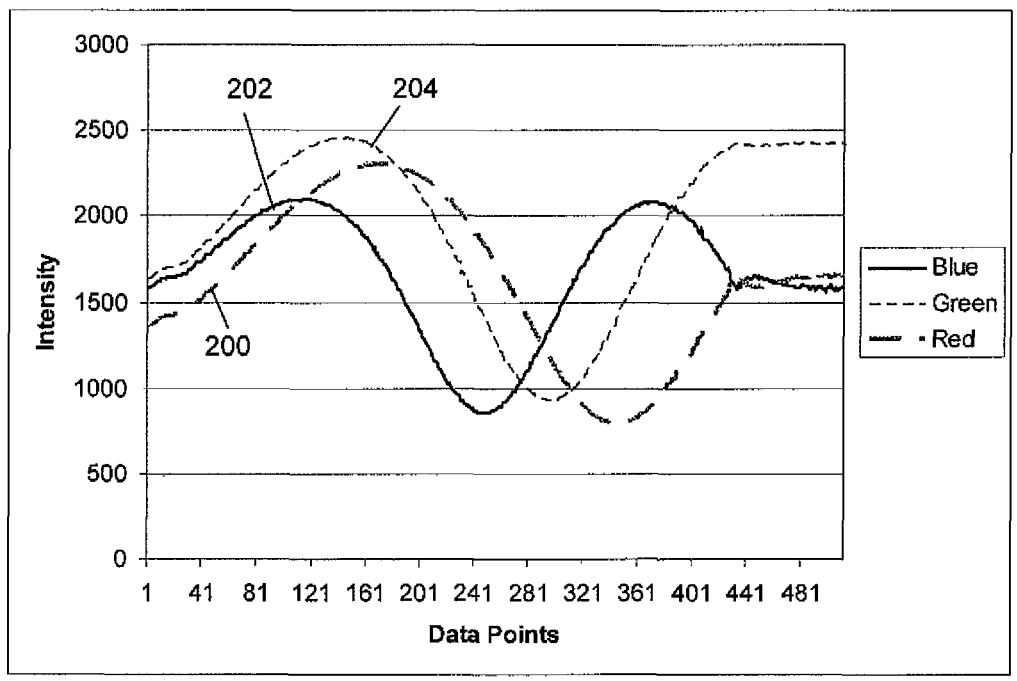
FIG. 2 shows measured intensity charges for RPM calibration.
Figure 3:
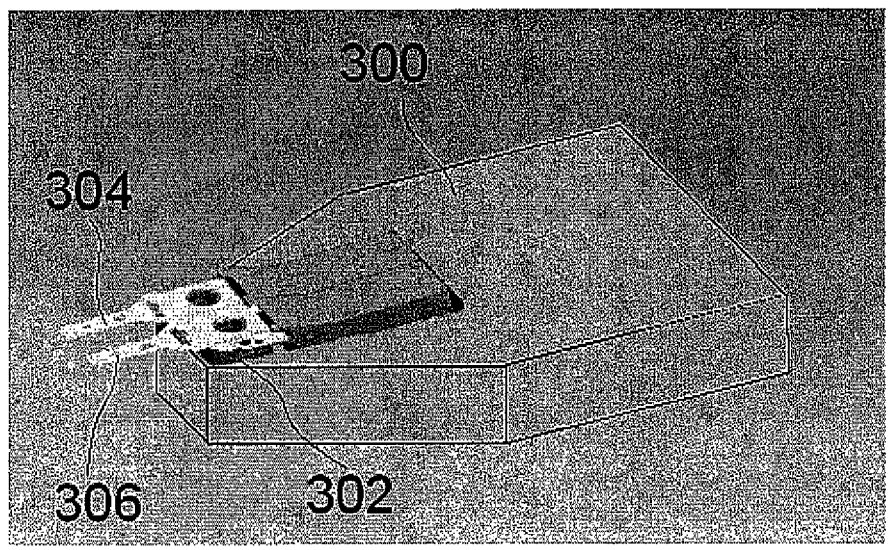
FIG. 3 shows a dual slider assembly cartridge used in FH measurement according to an example embodiment.

FIG. 3 shows a cartridge 300 which accommodates a dual slider assembly 302 where one of the sliders is a dummy slider 304 and the other slider is a testing slider 306. Both sliders 304, 306 are mounted side by side such that the flying height calibration and the measurement process can be done simultaneously without displacement of the cartridge 300. The dummy slider 304 can be repeatedly used with different testing sliders by merely changing the testing slider 306.

Figure 4:
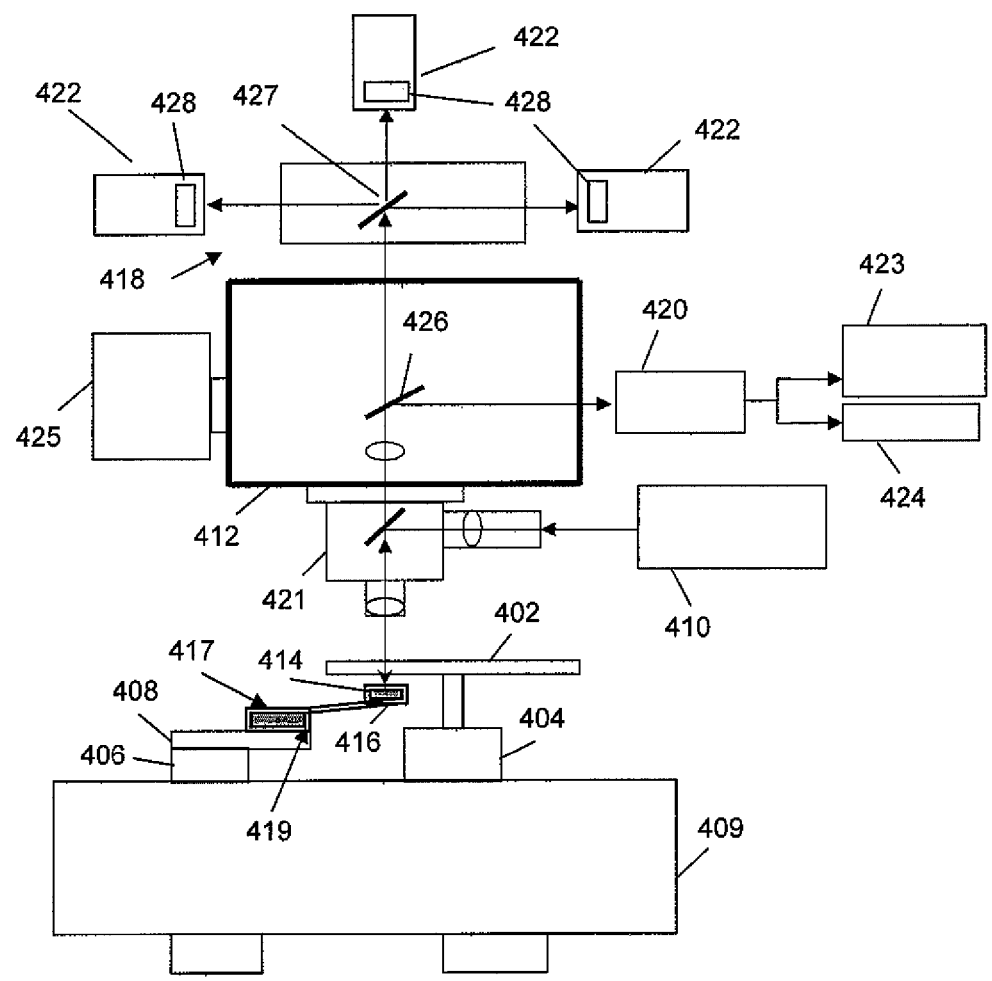
FIG. 4 shows a schematic diagram illustrating a flying height tester according to an example embodiment.

FIG. 4 shows a schematic diagram illustrating a flying height tester 400 in the example embodiment. The flying height tester 400 comprises a transparent disk 402 coupled to a spindle motor 404 which controls the rotational speed of the disk 402. An X-Y-Z stage 406 is provided for mounting a dual dummy and testing sliders cartridge 408 in the example embodiment. The spindle motor 404 and X-Y-Z stage 406 are mounted on an anti-vibration granite base 409. It will be appreciated that in different embodiments, single slider cartridges may be provided for the dummy and the testing slider respectively, each mounted on independent X-Y-Z stages. In such embodiments, a potential interaction between the behaviour of the dummy slider and the testing slider may be reduced.

The fly height tester 400 comprises a white light source 410, and an optics system schematically indicated at numeral 412 for directing a light signal from the light source 410 towards the surface of the disk 402 and the air bearing surfaces of the dummy and testing sliders 414, 416. The optics system 412 further comprises optical components for filtering different wavelengths prior to the detection optics system 418 for performing measurements at different wavelengths.

A microscope system including a CCD alignment camera 420, microscope optics 421, image acquisition unit 423 and monitor 424 is also provided to facilitate aligning of the incident light signal from the light source 410 on the respective air bearing surfaces of the dummy and testing sliders 414, 416.

In operation for calibration and measurement, the dummy and testing sliders 414, 416 are mounted on the cartridge 408 using mounting assemblies 417, 419, and the cartridge 408 is mounted on the X-Y-Z stage 406. Next, the pinhole of the optics system 412, coupled to an X-Y-Z stages unit 425, is positioned such that the incident light beam from the light source 410 is positioned at the trailing pad of the air bearing surface of the dummy slider 414. For the calibration measurement, the spindle motor speed is varied from about 1500 to about 20000 rpm while the intensity is captured in the detection optics system 418 via the optics system 412. The measured intensity is recorded and stored in the detection optics system 418. The detection optics system 418 in the example embodiment includes wavelength discriminating beam splitters 427, respective light filters 428 for each individual wavelength of interest, and respective low-noise photo-detector elements in the photo-detectors 422 for each wavelength to be measured.

In the example embodiment, the dummy slider 414 is designed such that for a variation of the rotational speed between about 1500 to about 20000 rpm, the dummy slider 414 undergoes a height variation of just more than half the respective wavelengths to be measured with the flying height tester 400, thus covering one maximum and minimum fringe intensities pair for the respective wavelengths. The maximum and minimum fringe intensities are determined by scanning through the measured intensity data over the rotational speed range, and saving the determined maximum and minimum intensities at the individual wavelengths for FH measurement.

The pinhole of the optics system 412 is then shifted to the sensors on the trailing pad of the air bearing surface of the testing slider 416. The light intensities measured from the testing slider 416 are then measured at one or more rotational speeds within the operational range of the testing slider 416, and for the respective wavelengths. The FH of the testing slider 416 can then be calculated using the maximum and minimum fringe intensities of the dummy slider 414 and the measured intensity of the testing slider 416 at the respective wavelengths. The testing slider 416 can then be replaced by another testing slider for a next measurement, while the dummy slider 414 may be re-used for a number of different testing slider measurements. In the described example, the calibration measurements using the dummy slider 414 are made for each respective optical condition at the time of measurement with different testing sliders, since the optical conditions may vary over time, to increase the accuracy of the respective calibration and flying height measurements.

In the following, the mathematical details of the calibration and measurement method described above are provided.

In the described example, there are three measured parameters.

$R_{cal\_min}$, i.e. the reflectivity derived from the minimum fringe intensity measured from the dummy slider;

$R_{measure}$, i.e. the reflectivity derived from the measured intensity from the testing slider (or the dummy slider), at a particular rotational speed, and $R_{cal\_max}$, i.e. the reflectivity derived from the maximum fringe intensity measured from the dummy slider.

Theoretical values for the maximum and minimum reflectivity, $R_{theory\_max}$ and $R_{theory\_min}$, can be calculated as follows:

$$R_{theory\_max} = \frac{r_1^2 + |r_2|^2 + 2r_1|r_2|}{1 + r_1^2|r_2|^2 + 2r_1|r_2|}, \quad (3)$$

$$R_{theory\_min} = \frac{r_1^2 + |r_2|^2 - 2r_1|r_2|}{1 + r_1^2|r_2|^2 - 2r_1|r_2|} \quad (4)$$

In order to relate a theoretical reflection value, $R_{theory}$, at a particular rotational speed to the measured parameters, the following equation can be utilised:

$$\frac{R_{theory} - R_{theory\_min}}{R_{theory\_max} - R_{theory\_min}} = \frac{R_{measure} - R_{cal\_min}}{R_{cal\_max} - R_{cal\_min}} \quad (5)$$

From equation (5), the following equation can be derived, relating $R_{theory}$ to the measured parameters as follows:

$$R_{theory} = \frac{R_{measure} - R_{cal\_min}}{R_{cal\_max} - R_{cal\_min}} \times (R_{theory\_max} - R_{theory\_min}) + R_{theory\_min} \quad (6)$$

where where $r_1$ is reflection coefficient of the disk-air, $r_2$ is reflection coefficient of the air-slider:

$$r_1 = \frac{n_1 - n_0}{n_1 + n_0}, \quad (7)$$

$$r_2 = \frac{n_0 - (n_2 + ik_2)}{n_0 + (n_2 + ik_2)} \quad (8)$$

where $n_o$ the real index of the air above the slider, $n_1$ is the real index of the disk material and ($n_2 - ik_2$) is the complex index of the slider material.

From equations (1) and (2) (see background), the following equation for $R_{theory}$ can be derived:

$$R_{theory} = \frac{I_{out}}{I_{in}} = \frac{r_1^2 + |r_2|^2 + 2r_1|r_2|\cos\left(\frac{4\pi FH}{\lambda} + \phi_s\right)}{1 + r_1^2|r_2|^2 + 2r_1|r_2|\cos\left(\frac{4\pi FH}{\lambda} + \phi_s\right)} \quad (9)$$

where $\phi_s$ is the phase shift on the reflection:

$$\phi_s = 2\pi - \tan^{-1}\left(\frac{2n_0 k_2}{n_0^2 - n_2^2 - k_2^2}\right) \quad (10)$$

From equation (9), FH can be calculated from the following equation:

$$FH = \frac{\cos^{-1}\left[\frac{r_1^2 + |r_2|^2 - R_{theory}(r_1^2|r_2|^2 + 1)}{2r_1|r_2|(R_{theory} - 1)}\right] - \phi_s}{4\pi} \cdot \lambda \quad (11)$$

Using equations (6) to (11), it will be appreciate by a person skilled in the art that FH can be calculated based on the measured parameters $R_{cal\_min}$, $R_{measure}$, and $R_{cal\_max}$.

Returning to FIG. 4, the rotational speed is controlled by the acceleration of the spindle motor 404, which is a constant value. Rapid acceleration can generate excessive heating, sliding and wear to the spindle motor 404 bearing and may eventually disrupt the stability of the acceleration. Therefore, smooth and steady acceleration is preferably used in the measurement so as to maintain the robustness of the spindle motor 404. This can reduce the jittering and noise in the spindle speed variation.

Figure 5:
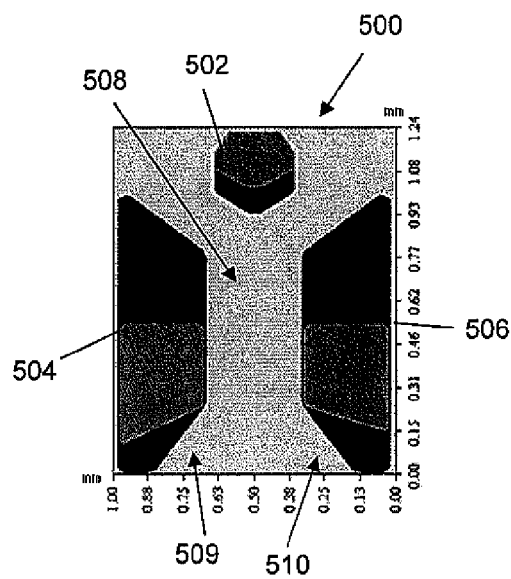
FIG. 5 shows an ABS design of a testing slider of the dual slider assembly cartridge of FIG. 3.
Figure 6:
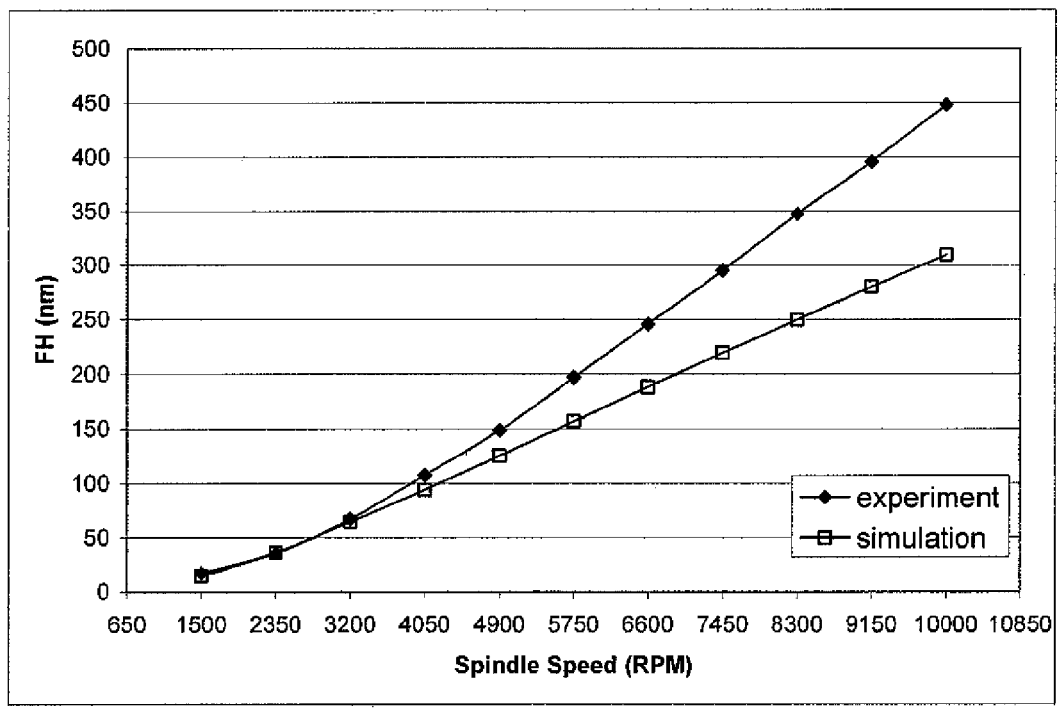
FIG. 6 is a graph of FH variation as a function of spindle speed for the dummy slider of the dual slider assembly cartridge of FIG. 3.

The dummy slider used in the described example for the maximum and minimum calibration process can fly from as high as 450 nm to as low as 10 nm. FIG. 5 and FIG. 6 show the ABS design 500 and the FH plot 600 against the spindle speed variation respectively. FIG. 6 shows that the FH varies from about 10 nm to about 450 nm as the spindle speed changes from about 1500 to about 10000 in an example speed range. The ABS design of the dummy slider is an important factor to determine the stability of the FH changes against the spindle speed. A preferred design for the dummy slider will minimize the fluctuation in the FH. A linearly and repeatable change of FH is preferable compared to non-linear and non-repeatable FH changes. The range of the spindle speed variation is preferably designed to accommodate the acceptable FH changes for the testing slider so that no slider-disk contact occurs during the measurement. Typically, the testing slider will have a pre-determined acceptable spindle speed range, e.g., 7000-12000 rpm. Higher or lower speeds than the acceptable spindle speed range can cause the testing slider to crash. Therefore, the dummy slider is preferably designed to have a FH variation that can accommodate this acceptable spindle speed range.

FIGS. 7a and b show schematic side and top views respectively illustrating a mounting assembly 700 design for the dummy and testing sliders. The mounting assembly 700 for a slider 708 comprises a base plate 702 and a suspension 704 coupled to the base plate 702 via a hinge 706. The slider 708 is mounted at the trailing end 710 of the suspension 704, and has the air bearing surface 712 facing towards the disk (not shown).

With reference to FIG. 5, the design concepts for the dummy slider in the example embodiment are:

i) A positive pressure instead of negative pressure slider design. The existence of negative pressure in the dummy slider design increases the suction force when the velocity of the air-flow rate increases; eventually reducing the ability of the slider to fly higher.

ii) Include a shallow step trailing pad 502 and side-pads 504, 506 for both sides of the slider. This increases the air-pressure of the slider when the linear velocity increases.

iii) Include a narrow groove 508 between the two side pads 504, 506 to generate a small amount of negative pressure which can reduce the FH to about 10 nm.

iv) Include a V-shape or chamfer 509, 510 at the leading edge for both of the side-pads 504, 506 to allow acceleration of the air-flow when the linear velocity of the slider increases.

The design of the dummy and testing sliders is different in functionality. The testing slider is typically designed to have an extremely low FH and thus a high negative pressure design is typically used. On the other hand, the dummy slider is designed to have a wide range of FH variation with respect to the linear velocity or the spindle speed to capture the maximum and minimum fringe intensity pair, as described above.

The optical constants (n and k) for the dummy and testing sliders are preferably similar as both of them can be fabricated from the same wafer and material. Both sliders are preferably fabricated in the same row-bar where they undergo the same etching, lapping, grinding, DLC over-coating and other fabrication processes. This can ensure that the optical constants do not vary significantly between the dummy and testing sliders due to the fabrication tolerances in the processes. The optical constants are an important factor in the measurement because of the light reflection dependency on the optical constant for different materials. The n and k differences between the dummy slider and the testing slider are preferably compensated accordingly in order to retain the measurement accuracy. Table 1 shows the optical constants for both of the sliders in an example embodiment.

TABLE 1

Optical constants for dummy slider and testing slider

| | Optical constant | | | | | |
|---|---|---|---|---|---|---|
| | n@450 | n@550 | n@650 | k@450 | k@550 | k@650 |
| Dummy Slider | 2.1351 | 2.146 | 2.1108 | 0.57193 | 0.50505 | 0.47724 |
| Testing Slider | 2.129 | 2.1381 | 2.0955 | 0.61661 | 0.54079 | 0.52469 |

The determination of, and compensation for the different optical constant values can be based on a number of techniques, for example the technique described in Leong et al., "On-Spot (n,k) Compensation by CCD for Precision Optical Flying Height Measurement", IEEE Transactions on Magnetics, Vol. 42, 10, October 2006, Pg 2534-2536. More particular, the n, k values for the dummy slider can be obtained through direct measurement. For the testing slider, an n, k map is first obtained, and the flying height measurement performed at a location having the closest n, k values compared to the ones determined for the dummy slider.

FIG. 8 shows a comparison of FH measurement results for both a conventional testing slider load/unload calibration technique (curve 800) and the RPM calibration of the example embodiment (curve 802). The results show that the load/unload method with high fluctuation resulted in a variation in the FH measurements, whereas the RPM method of the example embodiment provides measurement results.

TABLE 2

Standard deviation for the FH measurement

| | L/UL | RPM |
|---|---|---|
| Std dev | 1.151 | 0.263 |
| Average | 7.805 | 7.195 |

Table 2 shows the standard deviation for the respective FH measurements of FIG. 8. Better standard deviation can be achieved using the RPM method of the example embodiment, which provides a higher repeatable measurement, especially for low FH sliders and extremely high negative air-pressure ABS design sliders.

Figure 9:
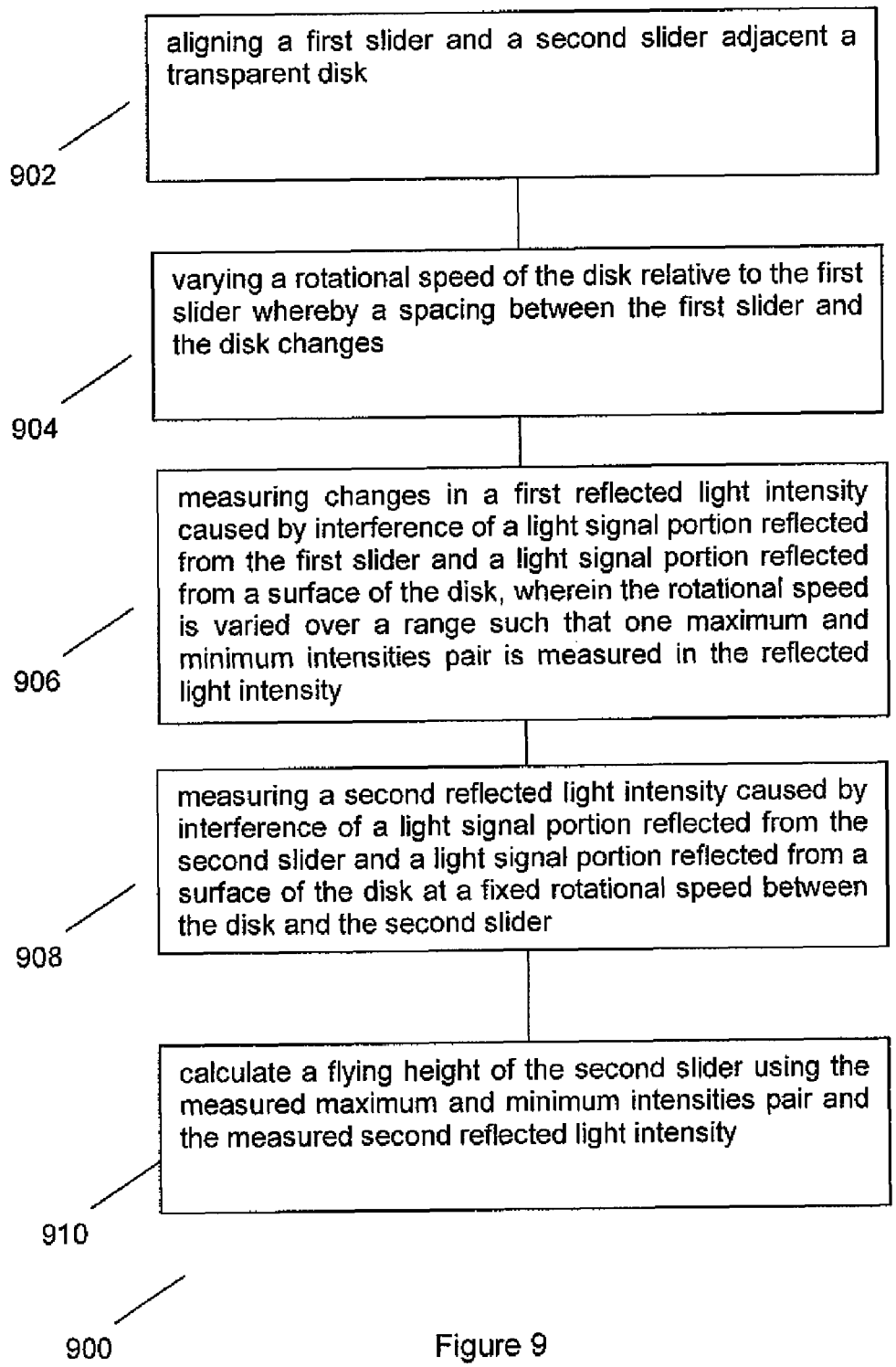
FIG. 9 shows a flow chart illustrating a method for optical flying height measurement according to an example embodiment.

FIG. 9 shows a flow chart 900 illustrating a method for optical flying height measurement according to an example embodiment. At step 902, a first slider and a second slider are aligned adjacent a transparent disk. At step 904, a rotational speed of the disk relative to the first slider is varied whereby a spacing between the first slider and the disk changes. At step 906, changes in a first reflected light intensity caused by interference of a light signal portion reflected from the first slider and a light signal portion reflected from a surface of the disk are measured, wherein the rotational speed is varied over a range such that one maximum and minimum intensities pair is measured in the reflected light intensity. At step 908, a second reflected light intensity caused by interference of a light signal portion reflected from the second slider and a light signal portion reflected from a surface of the disk is measured at a fixed rotational speed between the disk and the second slider. At step 910, a flying height of the second slider is calculated using the measured maximum and minimum intensities pair and the measured second reflected light intensity.

The described embodiments provide a method for optical flying height measurement. The described method provides a novel way in separating the head and the disk in the calibration process by utilizing a dual slider assembly where one of the slider is a dummy slider. The flying height of the dummy slider is preferably designed such that when the spindle speed is varied from about 1500 to about 20000 rpm; the flying height is linearly changed in the first order range of the light wavelength of 10 to 450 nm.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for optical flying height measurement, the method comprising the steps of:
   aligning a first slider and a second slider adjacent a transparent disk;
   varying a rotational speed of the disk relative to the first slider whereby a spacing between the first slider and the disk changes;
   measuring changes in a first reflected light intensity caused by interference of a light signal portion reflected from the first slider and a light signal portion reflected from a surface of the disk, wherein the rotational speed is varied over a range such that one maximum and minimum intensities pair is measured in the reflected light intensity;
   measuring a second reflected light intensity caused by interference of a light signal portion reflected from the second slider and a light signal portion reflected from a surface of the disk at a fixed rotational speed between the disk and the second slider; and
   calculate a flying height of the second slider using the measured maximum and minimum intensities pair and the measured second reflected light intensity.

2. The method as claimed in claim 1, wherein the first and second sliders are mounted on a single cartridge aligned adjacent the disk.

3. The method as claimed in claim 2, wherein the first and second sliders are aligned substantially in parallel with respect to each other on the cartridge.

4. The method as claimed in claim 1, wherein the first and second sliders are positioned on a same track of the disk utilizing separate cartridges.

5. The method as claimed in any one of the preceding claims, wherein the rotational speeds of the disk relative to the first and second sliders are varied by changing the rotating speed of the disk.

6. The method as claimed in claim 5, wherein the rotating speed of the disk is varied from about 1500 to about 20000 rpm.

7. The method as claimed in any one of the preceding claims, wherein the second slider has a smaller range of flying height variation than the first slider.

8. The method as claimed in claim 7, wherein the first slider has a positive pressure slider design.

9. The method as claimed in claim 7, or wherein the second slider has a negative pressure slider design.

10. The method as claimed in any one of the preceding claims, wherein the measurements of the changes in the first reflected light intensity and the second reflected light intensity comprises measurements at different wavelengths.

11. A flying height tester comprising:
    a transparent disk;
    means for aligning a first slider and a second slider adjacent a transparent disk;
    means for varying a rotational speed of the disk relative to the first slider whereby a spacing between the first slider and the disk changes;
    means for measuring changes in a first reflected light intensity caused by interference of a light signal portion reflected from the first slider and a light signal portion reflected from a surface of the disk, wherein the rotational speed is varied over a range such that one maximum and minimum intensities pair is measured in the reflected light intensity;
    means measuring a second reflected light intensity caused by interference of a light signal portion reflected from the second slider and a light signal portion reflected from a surface of the disk at a fixed rotational speed between the disk and the second slider; and
    means for calculating a flying height of the second slider using the measured maximum and minimum intensities pair and the measured second reflected light intensity.

12. The tester as claimed in claim 11, wherein the means for aligning the first and second sliders comprises a single cartridge aligned adjacent the disk.

13. The tester as claimed in claim 12, wherein the first and second sliders are aligned substantially in parallel with respect to each other on the cartridge.

14. The tester as claimed in claim 1, wherein the means for aligning the first and second sliders comprises separate cartridges for positioning on a same track of the disk.

15. The tester as claimed in claim 11, wherein the means for varying the rotational speeds of the disk relative to the first and second slider comprises a motor coupled to the disk for changing the rotating speed of the disk.

16. The tester as claimed in claim 15, wherein the rotating speed of the disk is variable from about 1500 to about 20000 rpm.

17. The tester as claimed in claim 11, wherein the second slider has a smaller range of flying height variation than the first slider.

18. The tester as claimed in claim 17, wherein the first slider has a positive pressure slider design.

19. The tester as claimed in claim 17, wherein the second slider has a negative pressure slider design.

20. The tester as claimed in claim 11, wherein the means for measurements of the changes in the first reflected light intensity and the means for measuring the second reflected light intensity are arranged for measurements at different wavelengths.

* * * * *